(12) United States Patent
Wang et al.

(10) Patent No.: US 11,012,928 B2
(45) Date of Patent: May 18, 2021

(54) METHOD AND NETWORK DEVICE FOR SELECTING SERVICE NETWORK, AND MANAGEMENT DEVICE

(71) Applicant: HUAWEI TECHNOLOGIES CO., LTD., Shenzhen (CN)

(72) Inventors: Yuan Wang, Shanghai (CN); Fenqin Zhu, Shanghai (CN); Jingwang Ma, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/975,800

(22) Filed: May 10, 2018

(65) Prior Publication Data

US 2018/0262979 A1    Sep. 13, 2018

Related U.S. Application Data

(63) Continuation of application No. PCT/CN2015/094236, filed on Nov. 10, 2015.

(51) Int. Cl.
*H04W 48/18* (2009.01)

(52) U.S. Cl.
CPC .................. *H04W 48/18* (2013.01)

(58) Field of Classification Search
None
See application file for complete search history.

(56) References Cited

U.S. PATENT DOCUMENTS

2004/0185837 A1    9/2004 Kim et al.
2009/0116467 A1    5/2009 Shi et al.
(Continued)

FOREIGN PATENT DOCUMENTS

CN    101087301 A    12/2007
CN    101505540 A    8/2009
(Continued)

OTHER PUBLICATIONS

3GPP TS 23.401 V13.4.0 (Sep. 2015);3rd Generation Partnership Project;Technical Specification Group Services and System Aspects;General Packet Radio Service (GPRS) enhancements for Evolved Universal Terrestrial Radio Access Network (E-UTRAN) access(Release 13),total 334 pages.
(Continued)

*Primary Examiner* — Kouroush Mohebbi
(74) *Attorney, Agent, or Firm* — Kilpatrick Townsend & Stockton LLP

(57) ABSTRACT

Embodiments of the present disclosure provide a method, a RAN node, and UE for selecting a service network, and a management device. The method includes: determining a service requirement list of the UE, where the service requirement list includes at least one service required by the UE; determining a service capability list set including a service capability list of at least one service network, where the service capability list includes an identifier of a service network corresponding to the service capability list and includes at least one service supported by the service network; and determining, according to the service requirement list and the service capability list set, a first identifier of a first service network that provides a service for the UE, where a service capability list of the first service network includes all or part of the at least one service in the service requirement list present disclosure.

11 Claims, 8 Drawing Sheets

(56) References Cited

U.S. PATENT DOCUMENTS

| | | |
|---|---|---|
| 2010/0061337 A1 | 3/2010 | Hallenstål et al. |
| 2010/0191595 A1 | 7/2010 | Graves et al. |
| 2013/0188515 A1 | 7/2013 | Pinheiro |
| 2014/0211728 A1 | 7/2014 | Zembutsu et al. |
| 2015/0117430 A1 | 4/2015 | Zhuang et al. |
| 2015/0156336 A1 | 6/2015 | Tamura et al. |
| 2017/0064691 A1* | 3/2017 | Kubota ................ H04W 48/18 |

FOREIGN PATENT DOCUMENTS

| | | |
|---|---|---|
| CN | 101789962 A | 7/2010 |
| CN | 102056273 A | 5/2011 |
| CN | 102196531 A | 9/2011 |
| CN | 102438277 A | 5/2012 |
| CN | 102469556 A | 5/2012 |
| CN | 103402190 A | 11/2013 |
| CN | 103858517 A | 6/2014 |
| EP | 2871870 A1 | 5/2015 |
| JP | 2007013753 A | 1/2007 |
| JP | 2011198343 A | 10/2011 |
| KR | 20040073335 A | 8/2004 |
| KR | 20130004497 A | 1/2013 |
| KR | 20150023032 A | 3/2015 |
| WO | 2013187144 A1 | 12/2013 |

OTHER PUBLICATIONS

XP050987489 S2-152420 ZTE,"Motivation for Core Network Slicing Study in SA2",SA WG2 Meeting #110,6—Jul. 10, 2015, Dubrovnik, Croatia, total 3 pages.

S1-153023 ZTE Corporation,"Clause 5.2—Network Slicing Clarifications",3GPP TSG-SA WG1 Meeting #71 bis, Vancouver, Canada, Oct. 19-21, 2015, total 3 pages.

* cited by examiner

METHOD AND NETWORK DEVICE FOR SELECTING SERVICE NETWORK, AND MANAGEMENT DEVICE

CROSS-REFERENCE TO RELATED PRESENT DISCLOSURES

This application is a continuation of International Application No. PCT/CN2015/094236, filed on Nov. 10, 2015, the disclosure of which is hereby incorporated by reference in its entirety.

TECHNICAL FIELD

The present disclosure relates to the mobile communications field, and more specifically, to a method, a network device, a radio access network (RAN) node, and user equipment for selecting a service network, and a management device.

BACKGROUND

Currently, in an evolved packet core (EPC), when a dedicated core (DÉCOR) network dynamically changes, for example, when a DÉCOR is out of service, user equipment (UE) corresponding to the DÉCOR needs to be migrated to another DÉCOR, that is, a corresponding DÉCOR is reselected for the UE.

In an existing DÉCOR network selection technology, a corresponding DÉCOR is mainly selected for the UE based on a relocation idea. Specific steps of the network selection technology are as follows.

(1). When the DÉCOR dynamically changes, for example, a network generates a new DÉCOR, or a DÉCOR is out of service, a home subscriber server (HSS) initiates a subscription data procedure, to update UE subscription data that is stored on a mobility management entity (MME), and the MME sends an acknowledgement message to the HSS.

(2). If the UE is in an idle state, the MME needs to initiate a paging procedure, and restore a channel between the MME and the UE.

(3). If the UE is in a connected state, the MME initiates a globally unique temporary UE identity (GUTI) relocation procedure and releases a radio resource, so that the UE initiates a tracking area update (TAU) request procedure.

(4). When the UE initiates the TAU request procedure to access an original DÉCOR, because the UE subscription data has been updated, it is determined that the original DÉCOR is unsuitable for continuing to provide a service for the UE, the original DÉCOR finds, according to the updated subscription data, a new DÉCOR that is suitable for the UE, and then the original DÉCOR initiates a re-guidance procedure, to instruct the RAN node to resend a request of the UE to the new DÉCOR.

(5). The new DÉCOR accepts an access request of the UE, and provides a service for the UE, so that a migration process of the UE is implemented.

The service network selection technology has the following problems: When UE that needs to be migrated performs a TAU redirection procedure and a re-guidance procedure to migrate the UE that is registered on the original DÉCOR to the new DÉCOR, a signaling storm is easily caused; in addition, to migrate the UE to another DÉCOR, the HSS needs to initiate a subscription data update procedure, to update subscription data of all UEs that are currently registered on the DÉCOR. For the HSS, signaling load is excessively heavy.

SUMMARY

The present disclosure provides a method, a radio access network node, and user equipment for selecting a service network, so that a process of selecting a service network when a service network dynamically changes can be simplified, and signaling can be saved.

According to a first aspect, a method for selecting a service network is provided, including: determining a service requirement list of the UE, where the service requirement list includes at least one service required by the UE; determining a service capability list set including a service capability list of at least one service network, where the service capability list includes an identifier of a service network corresponding to the service capability list and includes at least one service supported by the service network; and determining, according to the service requirement list and the service capability list set, a first identifier of a first service network that provides a service for the UE, where a service capability list corresponding to the first service network includes all or part of the at least one service in the service requirement list.

With reference to the first aspect, in a first possible implementation, the determining, according to the service requirement list and the service capability list set, a first identifier of a first service network that provides a service for the UE, where a service capability list corresponding to the first service network includes all or part of the at least one service in the service requirement list includes: determining, according to the service requirement list and the service capability list set, an identifier corresponding to a service capability list that includes a largest quantity of services in the service requirement list and that is in the service capability list set as the first identifier.

With reference to the first aspect or the first possible implementation, in a second possible implementation, the method is performed by the UE; the determining a service capability list set including a service capability list of at least one service network includes: receiving, by the UE, a first RRC message sent by a RAN node, where the first RRC message carries the service capability list set; and determining the service capability list set according to the first RRC message; and the method further includes: sending, by the UE, a second RRC message to the RAN node, where the second RRC message carries the first identifier, and the second RRC message is used to indicate that the first service network provides a service for the UE.

With reference to the second possible implementation, in a third possible implementation, the second RRC message further carries the service requirement list, so that the RAN node sends the service requirement list to the first service network.

With reference to the first aspect or the first possible implementation, in a fourth possible implementation, the method is performed by a RAN node; the determining a service requirement list of UE includes: receiving, by the RAN node, a third RRC message sent by the UE, where the third RRC message carries the service requirement list; and determining the service requirement list according to the third RRC message; and the determining a service capability list set including a service capability list of at least one service network includes: receiving, by the RAN node, the service capability list of the at least one service network sent by a management device, or receiving the service capability list of the at least one service network sent by the at least one service network; and determining the service capability list set including the service capability list of the at least one service network.

With reference to the third possible implementation or the fourth possible implementation, in a fifth possible implementation, the method further includes: sending, by the RAN node to the first service network, a message that carries the service requirement list and the first identifier, so that the first service network sends a notification message to the UE according to the service requirement list and the service capability list of the first service network, where the notification message is used to notify the UE of a service that is in the service requirement list and that is included in the service capability list of the first service network.

With reference to any one of the third to the fifth possible implementations, in a sixth possible implementation, the method further includes: receiving, by the RAN node, an instruction message sent by the management device, where the instruction message is used for instructing the RAN node to add, modify, or delete the service capability list of the at least one service network; and adding, modifying, or deleting, by the RAN node, the service capability list of the at least one service network in the service capability set according to the instruction message.

With reference to any one of the first aspect, or the first to the sixth possible implementations, in a seventh possible implementation, the service requirement list further includes a priority corresponding to a service; and the determining, according to the service requirement list and the service capability list set, a first identifier of a first service network that provides a service for the UE includes: searching the service capability list set according to services in the service requirement list in descending order of priorities corresponding to the services, to determine the first identifier of the first service network that provides a service for the UE.

According to a second aspect, a method for selecting a service network is provided, including: receiving, by a RAN node, a service capability list of at least one service network sent by a management device, or receiving a service capability list of at least one service network sent by the at least one service network, where the service capability list includes an identifier of a service network corresponding to the service capability list and includes at least one service supported by the service network; sending, by the RAN node, a first RRC message to UE, where the first RRC message carries a service capability list set including the service capability list of the at least one service network, the first RRC message is used by the UE to determine, according to a service requirement list of the UE and the service capability list set, a first identifier of a first service network that provides a service for the UE, a service capability list of the first service network includes all or part of the at least one service in the service requirement list, and the service requirement list includes at least one service required by the UE; and receiving, by the RAN node, a second RRC message sent by the UE, where the second RRC message carries the first identifier of the first service network in the at least one service network, and the second RRC message is used to indicate that the first service network provides a service for the UE.

With reference to the second aspect, in a first possible implementation, the second RRC message further carries the service requirement list; and the method further includes: sending, by the RAN node, the service requirement list to the first service network, so that the first service network sends a notification message to the UE according to the service requirement list and the service capability list of first service network, where the notification message is used to notify the UE of a service that is in the service requirement list and that is included in the service capability list of the first service network.

With reference to the second aspect or the first possible implementation, in a second possible implementation, the RAN node is further configured to receive an instruction message sent by the management device, where the instruction message is used for instructing the RAN node to add, modify, or delete the service capability list of the at least one service network; and the RAN node is further configured to add, modify, or delete the service capability list of the at least one service network in the service capability set according to the instruction message.

According to a third aspect, a method for selecting a service network is provided, including: determining, by UE, a service requirement list of the UE, where the service requirement list includes at least one service required by the UE; and sending, by the UE, an RRC message to a RAN node, where the RRC message carries the service requirement list, the RRC message is used by the RAN node to determine, according to the service requirement list and a service capability list set including a service capability list of at least one service network, a first identifier of a first service network that provides a service for the UE, a service capability list of the first service network includes all or part of the at least one service in the service requirement list, and the service capability list includes an identifier of a service network corresponding to the service capability list and includes at least one service supported by the service network.

With reference to the third aspect, in a first possible implementation, the method further includes: receiving, by the UE, a notification message that is sent by the first service network to the UE according to the service requirement list and the service capability list of the first service network, where the notification message is used to notify the UE of a service that is in the service requirement list and that is included in the service capability list of the first service network.

According to a fourth aspect, a method for managing a service network is provided, including: receiving, by a management device, a service capability list of the service network sent by a service network, where the service capability list includes an identifier of the service network and at least one service supported by the service network; and sending, by the management device, the service capability list to a RAN node.

With reference to the fourth aspect, in a first possible implementation, the method further includes: generating, by the management device, an instruction message, where the instruction message is used for instructing the RAN node to add, modify, or delete the service capability list of the service network; and sending, by the management device, the instruction message to the RAN node.

According to a fifth aspect, a network device for selecting a service network is provided, including a receiver, a processor, and a transmitter, where the receiver is configured to receive a message, and the transmitter is configured to send the message; the processor is configured to determine a service requirement list of user equipment UE, where the service requirement list includes at least one service required by the UE; the processor is further configured to determine a service capability list set including a service capability list of at least one service network, where the service capability list includes an identifier of a service network corresponding to the service capability list and includes at least one service supported by the service network; and the processor is further configured to determine, according to the service requirement list and the service capability list set, a first identifier of a first service network that provides a service for the UE, where a service capability list corresponding to the first service network includes all or part of the at least one service in the service requirement list.

With reference to the fifth aspect, in a first possible implementation, the processor is specifically configured to determine, according to the service requirement list and the service capability list set, an identifier corresponding to a service capability list that includes a largest quantity of services in the service requirement list and that is in the service capability list set as the first identifier.

With reference to the fifth aspect or the first possible implementation, in a second possible implementation, the network device is the UE; the receiver is configured to receive a first RRC message sent by a RAN node, where the first RRC message carries the service capability list set; the processor is specifically configured to determine the service capability list set according to the first RRC message received by the receiver; and the transmitter is configured to send a second RRC message to the RAN node, where the second RRC message carries the first identifier.

With reference to the second possible implementation, in a third possible implementation, the second RRC message further carries the service requirement list, so that the RAN node sends, to the first service network, a message that carries the service requirement list.

With reference to the fifth aspect or the first possible implementation, in a fourth possible implementation, the network device is a RAN node; the receiver is configured to receive a third RRC message sent by the UE, where the third RRC message carries the service requirement list; the processor is specifically configured to determine the service requirement list according to the third RRC message received by the receiver; the receiver is further configured to: receive the service capability list of the service network sent by a management device, or receive the service capability list of the at least one service network sent by the at least one service network; and the processor is further specifically configured to determine the service capability list set including the service capability list of the at least one service network.

With reference to the third possible implementation or the fourth possible implementation, in a fifth possible implementation, the transmitter is configured to send, to the first service network, a message that carries the service requirement list, so that the first service network sends a notification message to the UE according to the service requirement list and the service capability list of the first service network, where the notification message is used to notify the UE of a service that is in the service requirement list and that is included in the service capability list of the first service network.

With reference to any one of the third to the fifth possible implementations, in a sixth possible implementation, the receiver is further configured to receive an instruction message sent by the management device, the instruction message is used for instructing the RAN node to add, modify, or delete the service capability list of the at least one service network; and the processor is further configured to add, modify, or delete the service capability list of the at least one service network in the service capability set according to the instruction message.

With reference to any one of the fifth aspect, or the first to the sixth possible implementations, in a seventh possible implementation, the service requirement list further includes a priority corresponding to the at least one service required by the UE, and the processor is specifically configured to search the service capability list set according to services in the service requirement list in descending order of priorities corresponding to the services, to determine the first identifier of the first service network that provides a service for the UE.

According to a sixth aspect, a RAN node for selecting a service network is provided, including a transmitter and a receiver, where the receiver is configured to: receive a service capability list of at least one service network sent by a management device, or receive a service capability list of at least one service network sent by the at least one service network, where the service capability list includes an identifier of a service network corresponding to the service capability list and includes at least one service supported by the service network; the transmitter is configured to send a first RRC message to UE, where the first RRC message carries a service capability list set including the service capability list of the at least one service network, the first RRC message is used by the UE to determine, according to a service requirement list of the UE, a first identifier of a first service network that provides a service for the UE from the service capability list set, a service capability list of the first service network includes all or part of the at least one service in the service requirement list, and the service requirement list includes at least one service required by the UE; and the receiver is configured to receive a second RRC message sent by the UE, where the second RRC message carries the first identifier of the first service network in the at least one service network, and the second RRC message is used to indicate that the first service network provides a service for the UE.

With reference to the sixth aspect, in a first possible implementation, the second RRC message further carries the service requirement list; and the transmitter is further configured to send the service requirement list to the first service network, so that the first service network sends a notification message to the UE according to the service requirement list and the service capability list of the service network, where the notification message is used to notify the UE of a service that is in the service requirement list and that is included in the service capability list of the first service network.

With reference to the sixth aspect or the first possible implementation, in a second possible implementation, the receiver is further configured to receive an instruction message sent by the management device, where the instruction message is used for instructing the RAN node to add, modify, or delete the service capability list of the at least one service network; and the RAN node further includes a processor, configured to add, modify, or delete the service capability list of the at least one service network in the service capability set according to the instruction message.

According to a seventh aspect, user equipment UE for selecting a service network is provided, including a processor and a transmitter, where the processor is configured to determine a service requirement list of the UE, where the service requirement list includes at least one service required by the UE; and the transmitter is configured to send an RRC message to a RAN node, where the RRC message carries the service requirement list, the RRC message is used by the RAN node to determine, according to the service requirement list and a service capability list set including a service capability list of at least one service network, a first identifier of a first service network that provides a service for the UE, a service capability list of the first service network includes all or part of the at least one service in the service requirement list, and the service capability list includes an identifier of a service network corresponding to the service capability list and includes at least one service supported by the service network.

With reference to the seventh aspect, in a first possible implementation, the UE further includes a receiver, configured to receive a notification message that is sent by the first service network to the UE according to the service requirement list and the service capability list of the first service network, where the notification message is used to notify the UE of a service that is in the service requirement list and that is included in the service capability list of the first service network.

According to an eighth aspect, a management device is provided, including a receiver and a transmitter, where the receiver is configured to receive a service capability list of a service network sent by the service network, and the service capability list includes an identifier of the service network and at least one service supported by the service network; and the transmitter is configured to send the service capability list to a RAN node.

With reference to the eighth aspect, in a first possible implementation, the management device further includes a processor, configured to generate an instruction message, where the instruction message is used for instructing the RAN node to add, modify, or delete the service capability list of the service network; and the transmitter is further configured to send the instruction message to the RAN node.

According to a ninth aspect, a network device for selecting a service network is provided, including a processing module, where the processing module is configured to determine a service requirement list of user equipment UE, and the service requirement list includes at least one service required by the UE; the processing module is further configured to determine a service capability list set including a service capability list of at least one service network, where the service capability list includes an identifier of a service network corresponding to the service capability list and includes at least one service supported by the service network; and the processing module is further configured to determine, according to the service requirement list and the service capability list set, a first identifier of a first service network that provides a service for the UE, where a service capability list corresponding to the first service network includes all or part of the at least one service in the service requirement list.

With reference to the ninth aspect, in a first possible implementation, the processing module is specifically configured to determine, according to the service requirement list and the service capability list set, an identifier corresponding to a service capability list that includes a largest quantity of services in the service requirement list and that is in the service capability list set as the first identifier.

With reference to the ninth aspect or the first possible implementation, in a second possible implementation, the network device is the UE; the UE further includes a receiving module and a sending module, where the receiving module is configured to receive a first RRC message sent by a RAN node, and the first RRC message carries the service capability list set; the processing module is specifically configured to determine the service capability list set according to the first RRC message received by the receiving module; and the sending module is configured to send a second RRC message to the RAN node, where the second RRC message carries the first identifier.

With reference to the second possible implementation, in a third possible implementation, the second RRC message further carries the service requirement list, so that the RAN node sends, to the first service network, a message that carries the service requirement list.

With reference to the ninth aspect or the first possible implementation, in a fourth possible implementation, the network device is a RAN node; the RAN node further includes a receiving module, where the receiving module is configured to receive a third RRC message sent by the UE, and the third RRC message carries the service requirement list; the processing module is specifically configured to determine the service requirement list according to the third RRC message received by the receiving module; the receiving module is further configured to: receive the service capability list of the service network sent by a management device, or receive the service capability list of the at least one service network sent by the at least one service network; and the processing module is further specifically configured to determine the service capability list set including the service capability list of the at least one service network.

With reference to the third possible implementation or the fourth possible implementation, in a fifth possible implementation, the RAN node further includes a sending module, configured to send, to the first service network, a message that carries the service requirement list, so that the first service network sends a notification message to the UE according to the service requirement list and the service capability list of the first service network, where the notification message is used to notify the UE of a service that is in the service requirement list and that is included in the service capability list of the first service network.

With reference to any one of the third to the fifth possible implementations, in a sixth possible implementation, the receiving module is further configured to receive an instruction message sent by the management device, the instruction message is used for instructing the RAN node to add, modify, or delete the service capability list of the at least one service network; and the processing module is further configured to add, modify, or delete the service capability list of the at least one service network in the service capability set according to the instruction message.

With reference to any one of the ninth aspect, or the first to the sixth possible implementations, in a seventh possible implementation, the service requirement list further includes a priority corresponding to the at least one service required by the UE, and the processor is specifically configured to search the service capability list set according to services in the service requirement list in descending order of priorities corresponding to the services, to determine the first identifier of the first service network that provides a service for the UE.

According to a tenth aspect, a RAN node for selecting a service network is provided, including a sending module and a receiving module, where the receiving module is configured to: receive a service capability list of at least one service network sent by a management device, or receive a service capability list of at least one service network sent by the at least one service network, where the service capability list includes an identifier of a service network corresponding to the service capability list and includes at least one service supported by the service network; the sending module is configured to send a first RRC message to user equipment UE, where the first RRC message carries a service capability list set including the service capability list of the at least one service network, the first RRC message is used by the UE to determine, according to a service requirement list of the UE and the service capability list set, a first identifier of a first service network that provides a service for the UE, a service capability list of the first service network includes all or part of the at least one service in the service requirement list, and the service requirement list includes at least one service required by the UE; and the receiving module is configured to receive a second RRC message sent by the UE, where the second RRC message carries the first identifier of the first service network in the at least one service network, and the second RRC message is used to indicate that the first service network provides a service for the UE.

With reference to the tenth aspect, in a first possible implementation, the second RRC message further carries the service requirement list; and the sending module is further configured to send the service requirement list to the first service network, so that the first service network sends a notification message to the UE according to the service requirement list and the service capability list of the service network, where the notification message is used to notify the UE of a service that is in the service requirement list and that is included in the service capability list of the first service network.

With reference to the tenth aspect or the first possible implementation, in a second possible implementation, the receiving module is further configured to receive an instruction message sent by the management device, and the instruction message is used for instructing the RAN node to add, modify, or delete the service capability list of the at least one service network; and the RAN node further includes a processing module, configured to add, modify, or delete the service capability list of the at least one service network in the service capability set according to the instruction message.

According to an eleventh aspect, UE for selecting a service network is provided, including a processing module and a sending module, where the processing module is configured to determine a service requirement list of the UE, where the service requirement list includes at least one service required by the UE; and the sending module is configured to send an RRC message to a RAN node, where the RRC message carries the service requirement list, the RRC message is used by the RAN node to determine, according to the service requirement list from a service capability list set including a service capability list of at least one service network, a first identifier of a first service network that provides a service for the UE, a service capability list of the first service network includes all or part of the at least one service in the service requirement list, and the service capability list includes an identifier of a service network corresponding to the service capability list and includes at least one service supported by the service network.

With reference to the eleventh aspect, in a first possible implementation, the UE further includes a receiving module, configured to receive a notification message that is sent by the first service network to the UE according to the service requirement list and the service capability list of the first service network, where the notification message is used to notify the UE of a service that is in the service requirement list and that is included in the service capability list of the first service network.

According to a twelfth aspect, a management device is provided, including a receiving module and a sending module, where the receiving module is configured to receive a service capability list of a service network sent by the service network, and the service capability list includes an identifier of the service network and at least one service supported by the service network; and the sending module is configured to send the service capability list to a RAN node.

With reference to the twelfth aspect, in a first possible implementation, the management device further includes a processing module, configured to generate an instruction message, where the instruction message is used for instructing the RAN node to add, modify, or delete the service capability list of the service network; and the sending module is further configured to send the instruction message to the RAN node.

According to technical solutions of the present disclosure, when a service network dynamically changes, a service network that can meet a service requirement of the UE is selected for the UE according to a service requirement of a terminal device and a service supported by the service network. According to the technical solutions of the present disclosure, a process of selecting a service network when a service network dynamically changes can be simplified, and signaling can be saved.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
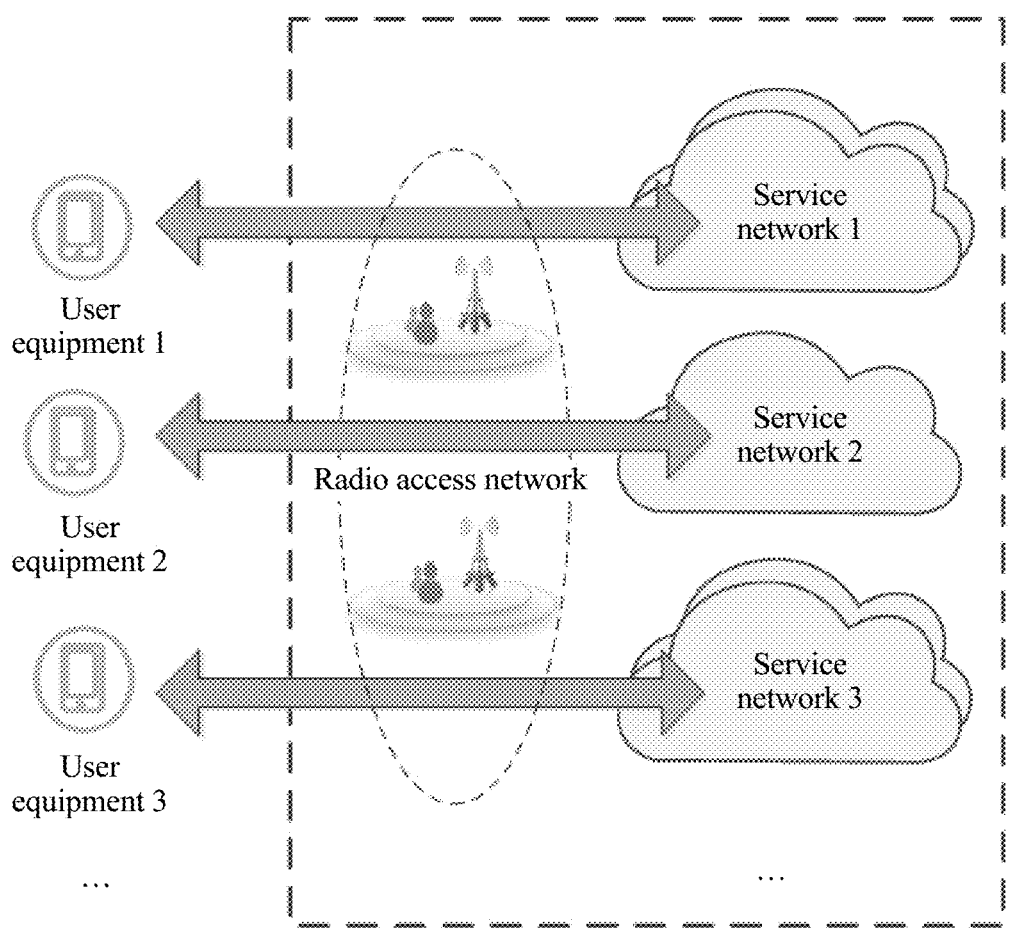
FIG. 1 is a schematic diagram of a network architecture system according to an embodiment of the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

For ease of understanding, brief descriptions are provided below with reference to an application scenario of an embodiment of the present disclosure shown in FIG. 1. An architecture system shown in FIG. 1 may be specifically an architecture system of a 5G network, or may be specifically an architecture system of a conventional network, such as an architecture system of a 4G network. The network architecture shown in FIG. 1 includes UE, a RAN, and a service network.

The UE may be a conventional 4G terminal device, or may be a terminal device that supports the 5G network. According to an actual application scenario and a terminal device type, the UE may support one or more types of services. A service requirement list may be configured on the UE, and the service requirement list includes one or more types of services supported by the UE.

A RAN node in a RAN network may be a radio base station, such as an evolved NodeB (eNodeB). After a radio channel is established between the UE and the RAN node, the UE accesses a service network by using the RAN node, to obtain a service provided by the service network.

For a specific type of scenario or a specific user requirement, the service network may provide a customized service for UE of a particular type. According to an actual application scenario and a terminal device type, the service network may support one or more types of services, to ensure that the UE obtains a complete service. After the service network is generated, a service capability list of the service network is defined, to record an identifier of this network slice and a service that is supported by this network slice. The service network may be a dedicated core network in an EPC architecture, or may be a network slice in the 5G network.

In a future 5G system, the network is further abstracted into a network slice based on a logical function. The network slice is not logically divided into network elements, but is created in a "customized function+general hardware" manner. According to such a network structure, an operator is allowed to provide a network for a user as a service, and can freely combine entity networks according to indicators such as a rate, a capacity, coverage, a delay, reliability, security, and availability, so as to meet requirements of different users.

By using a software-defined networking (SDN) technology and a network functions virtualization (NFV) technology, a customized network slice may be provided for different types of communication users on a same infrastructure. For example, user equipment 1 in FIG. 1 may be UE that uses a mobile broadband (MBB), user equipment 2 may be UE that uses vehicle to vehicle (V2V) communication, user equipment 3 may be UE that uses machine type communication (MTC), a service network 1 may be an MBB network slice, a service network 2 may be a V2V network slice, and a service network 3 may be an MTC network slice.

The architecture system shown in FIG. 1 may further include a management device. A service capability list of one or more service networks is deployed on the management device, and the management device may be configured to manage the one or more service networks. When the management device can learn the service capability list of the service network, or when the service network is faulty due to a geographical restriction or another reason and is out of service for the UE, the management device instructs a RAN node to delete the service capability list of the service network.

It should be understood that a technical solution for selecting a service network in the embodiments of the present disclosure is not limited to the network architecture shown in FIG. 1. The embodiments of the present disclosure may also be applied to another network architecture that is similar to network function modularization or servitization.

Figure 2:
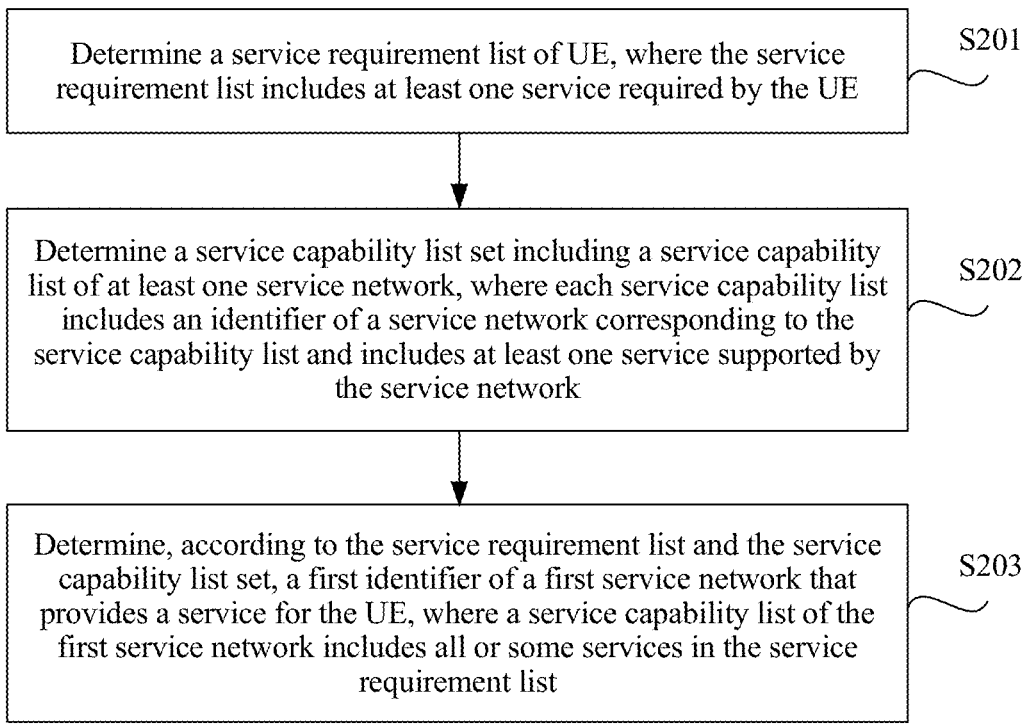
FIG. 2 is a schematic flowchart of a method for selecting a service network according to an embodiment of the present disclosure.

FIG. 2 is a schematic flowchart of a method for selecting a service network according to an embodiment of the present disclosure. The method in FIG. 2 includes the following steps.

S201. Determine a service requirement list of UE, where the service requirement list includes at least one service required by the UE.

S202. Determine a service capability list set including a service capability list of at least one service network, where the service capability list includes an identifier of a service network corresponding to the service capability list and includes at least one service supported by the service network.

S203. Determine, according to the service requirement list and the service capability list set, a first identifier of a first service network that provides a service for the UE, where a service capability list of the first service network includes all or part of the at least one service in the service requirement list.

According to the method for selecting a service network in the present disclosure, when a service network dynamically changes, a service network that meets a service requirement may be selected for the UE according to the service requirement of a terminal device and a service capability of the service network, so that a process of selecting a service network when a service network dynamically changes can be simplified, and signaling can be saved.

In this embodiment of the present disclosure, a network device (such as an HSS) may configure the service requirement list for the UE according to a capability of the UE and a service to which the UE subscribes. The service to which the UE subscribes may be a call service, a mobile broadband service, a machine type communication service, a vehicle-to-vehicle communication service, an ultra-low delay service, a super-high-reliability service, an Internet Protocol (IP) continuity maintaining service, or the like. According to an actual application scenario and a terminal type, the UE may support one or more types of services. For example, UE of a vehicle type may implement self-driving by using the vehicle-to-vehicle communication service, and a high-definition video is watched by using the mobile broadband service, and therefore a service requirement list of the UE may include the vehicle-to-vehicle communication service and the mobile broadband service. All these services are listed in the service requirement list.

Table 1 is an example of the service requirement list of the UE. It may be learned from Table 1 that the UE may support a voice service, a mobile broadband service, a super-high-reliability service, and another service.

TABLE 1

| Service requirement list | | | |
|---|---|---|---|
| Service 1 | Service 2 | Service 3 | ... |
| Voice service | Mobile broadband service | Super-high-reliability service | ... |

The network device sends the generated service requirement list to the UE, and the UE may store the service requirement list in a subscriber identity module (SIM) card storage manner, or directly store the service requirement list.

In this embodiment of the present disclosure, optionally, a radio link may be established between the UE and a RAN node, and for example, when sending an RRC message to the RAN node, the UE transfers, in the RRC message, the service requirement list of the UE to the RAN node. Because the RRC message sent by the UE to the RAN node is usually a non-access stratum (NAS) message defined in a standard, the service requirement list of the UE may be sent together with the NAS message.

In this embodiment of the present disclosure, a network service capability list of a service network is defined when the service network is generated, to indicate a service supported by the service network. According to an actual application scenario, the service network may support one or more types of services. For example, a service network used in an industrial control scenario may simultaneously support the machine type communication service, the ultra-low delay service, and the super-high-reliability service. All these services are listed in a service capability list.

Table 2 is an example of the service capability list of the service network. It may be learned from Table 2 that the service network may support a voice service, a mobile broadband service, a super-high-reliability service, and another service.

TABLE 2

| Service capability list | | | | |
|---|---|---|---|---|
| Service network identifier | Service 1 | Service 2 | Service 3 | ... |
| Identifier 1 | Voice service | Mobile broadband service | Super-high-reliability service | ... |

After a new service network is generated, a service capability list of the service network may be configured on the RAN node during actual deployment of the service network.

When the service capability list of the service network in a network changes, a management device may further instruct the RAN node to modify the service capability list corresponding to the service network.

After the RAN node modifies, according to an instruction message sent by the management device, the service capability list corresponding to the service network, and updates the service capability list set, when UE that is originally served by the service network re-accesses the network, the RAN node, the UE, or another network management device may select, according to a newest service capability list set, a service network that provides a service for the UE, so that a redirection process is avoided and signaling is saved.

A service network deployed in the network may be faulty due to a geographical restriction and is out of service for the UE. If the service network is faulty, the management device may instruct a RAN node within a service range of the service network to delete a service capability list of the service network.

The RAN node deletes the service capability list corresponding to the out-of-service service network from the service capability list set according to the instruction message sent by the management device, and updates the service capability list set. When the UE that is originally served by the service network re-accesses the network, the RAN node, the UE, or another network management device may select, according to a newest service capability list set, a service network that provides a service for the UE, so that a redirection process is avoided and signaling is saved.

For a local network, the UE usually has a dedicated service network that can support all services of the UE, but there are some service networks that can support only some services of the UE.

Optionally, after the RAN node has the service capability list set, the RAN node may compare the service requirement list of the UE that is sent by the UE by using the RRC message with a service capability list in the service capability list set on the RAN node. Specifically, a service in the service requirement list and a service in the service capability list are compared, so as to find a service capability list that can include all or part of the at least one service in the service requirement list. A service network corresponding to an identifier in the service capability list is a service network that provides a service for the UE and that is selected by the RAN node for the UE.

Generally, a service network that can provide a largest quantity of required services for the UE and that is in a plurality of service networks may be determined as the service network that provides a service for the UE.

For example, the service requirement list of the UE received on the RAN node is shown in Table 1, and the service capability list on the RAN node is the service capability list shown in Table 2, that is, the service capability list set is shown in Table 3, and then it may be learned by comparing the service requirement list shown in Table 1 with the service capability list set shown in Table 3 that a service capability list corresponding to an identifier 1 includes all services in the service requirement list of the UE, that is, a service network corresponding to the identifier 1 may support a largest quantity of services required by the UE. Therefore, the RAN node may select the service network corresponding to the identifier 1 as the service network that provides a service for the UE.

TABLE 3

| Service capability list set on the RAN node | | | | |
|---|---|---|---|---|
| Service network identifier | Service 1 | Service 2 | Service 3 | ... |
| Identifier 1 | Voice service | Mobile broadband service | Super-high-reliability service | ... |

TABLE 3-continued

Service capability list set on the RAN node

| Service network identifier | Service 1 | Service 2 | Service 3 | ... |
|---|---|---|---|---|
| Identifier 2 | Machine type communication service | Super-high-reliability service | Ultra-low delay service | |
| Identifier 3 | Vehicle-to-vehicle communication service | Mobile broadband service | | |

After the RAN node determines an identifier of the service network that provides a service for the UE, a normal service procedure may be performed between the UE and the selected service network.

Optionally, the RAN node may send the service requirement list of the UE to the service network that provides a service for the UE. After receiving the service requirement list of the UE, the service network may compare the service requirement list of the UE with a service capability list of the network that provides a service for the UE. If the service network cannot support all services of the UE, that is, can support only some services required by the UE, the service network sends a notification message to the UE, to notify the UE of a service that can be currently provided by the service network for the UE. For example, the UE is notified by using a NAS acceptance message, so that the UE determines, with reference to the NAS acceptance message, a service that can be requested in a subsequent service request.

In this embodiment of the present disclosure, optionally, when the radio link may be established between the RAN node and the UE, the RAN node may transfer, in the RRC message, service capability lists of a plurality of service networks to the UE, such as the service capability list set that includes a plurality of service capability lists and that is shown in Table 3.

In this case, the UE compares a service in the service requirement list of the UE (such as the service requirement list shown in Table 1) with services in the plurality of service capability lists, and selects a service capability list (such as the service capability list corresponding to the identifier 1 in Table 3) including all or part of the at least one service in the service requirement list. A service network corresponding to an identifier (such as the identifier 1 in Table 3) in the service capability list is the service network that provides a service for the UE and that is selected for the UE. Subsequently, when sending the RRC message to the RAN node, the UE may send the identifier (such as the identifier 1 in Table 3) to the RAN node. Therefore, a normal service procedure may be performed between the UE and the selected service network by using the RAN node.

The UE may further send a service (such as the service requirement list shown in Table 1) required by the UE to the RAN node. After the RAN node receives the service requirement list of the UE sent by the UE, optionally, the RAN node may send the service requirement list of the UE to the service network that provides a service and that is selected by the RAN node for the UE. After receiving the service requirement list of the UE, the service network may compare the service requirement list of the UE with the service capability list of the service network, to determine a service that can be provided by the service network for the UE.

In this case, because the UE has compared the service requirement list of the UE with the service capability list of the service network, the UE has already clearly known a service that is of the UE and that can be supported by the currently selected service network, and the service network does not need to notify the UE of the service that can be provided by the service network for the UE.

According to the method for selecting a service network in this embodiment of the present disclosure, the UE may actively select, according to the service requirement list of the UE, a service network that matches a current service requirement from the service capability list set, so that a process of selecting a service network when the network dynamically changes can be simplified, and signaling can be saved.

Optionally, the method for selecting a service network in this embodiment of the present disclosure may be performed by a management device of a network slice in a future 5G network architecture, that is, the management device obtains the service requirement list of the UE and a service capability list of the network slice, and selects, according to the service requirement list of the UE, a service network that matches a current service requirement of the UE from service capability lists of a plurality of network slices, so that a process of selecting a service network when the network dynamically changes can be simplified, and signaling can be saved.

Optionally, the RAN node in this embodiment may be a RAN node in a visited place accessed by the UE in a roaming scenario. In this case, the RAN node in a roaming area selects a service network for the UE according to the service requirement list of the UE and a service capability list of a service network of the roaming area, to ensure roaming access of the UE.

According to the method for selecting a service network in this embodiment of the present disclosure, in a dynamic situation, for example, when a service network is dynamically generated, dynamically updated, or is faulty, the RAN node may add or delete a service capability list of the configured service network, so that the UE can perform normal access when the service network dynamically changes. Therefore, not only the UE accesses the service network more flexibly and more effectively, but a redirection process is avoided and a large amount of signaling is saved.

In the actual scenario to which this embodiment of the present disclosure is applied, because the dedicated service network of the UE is usually deployed on the local network, a service network that meets all service requirements of the UE may be selected for the UE in the local network, but there may be a network that cannot meet all the service requirements of the UE. For another example, in the roaming scenario, the dedicated network of the UE may not be deployed in a roaming network, and a service network in the roaming network can provide only some services required by the UE. In this case, a priority of the service required by the UE needs to be considered, that is, when the service requirement list of the UE is defined, a priority of the service required by the UE is defined. A service network that can provide a best-matched service is selected for the UE according to the priority of the service. The service network that can provide a best-matched service may be a service network that can provide a largest quantity of matched services, or may be a service network that can provide a largest quantity of high-priority services. The service network that can provide a best-matched service is not limited in the present disclosure.

A service requirement list in which a priority of the service required by the UE is defined is shown in Table 4. It may be learned from Table 4 that in services required by the UE, the voice service has a high priority, the mobile broadband service has a normal priority, and the super-high-reliability service has a low priority.

TABLE 4

| Service requirement list to which a priority is introduced | | | | |
|---|---|---|---|---|
| | Service 1 | Service 2 | Service 3 | ... |
| Service type | Voice service | Mobile broadband service | Super-high-reliability service | ... |
| Priority | High | Normal | Low | ... |

For example, when comparing the service requirement list of the UE with the service capability list of the service network, the RAN node needs to preferably select, for the UE, a service network that can provide a high-priority service. For example, when a service capability list that matches the service requirement list is to be selected from the service capability list set, a service capability list that includes the high-priority voice service may be preferably selected.

Optionally, when the plurality of service capability lists simultaneously include a high-priority service in the service requirement list, a service capability list that includes a second-highest-priority service in the service requirement list may be determined in the plurality of service capability lists, and the rest may be deduced by analogy till the best-matched service capability list is found. In this case, a service network corresponding to the service capability list can provide a best-matched service for the UE.

For example, when the service requirement list of the UE is shown in Table 4, if a service network 1 can provide the voice service and the mobile broadband service, a service network 2 can provide the voice service and the super-high-reliability service, and a service network 3 can provide the mobile broadband service, it may be determined, when a high-priority service required by the UE is the voice service, that the service network 1 and the service network 2 can provide the high-priority service, and it may be determined, when a second-highest-priority service required by the UE is the mobile broadband service and the service network 1 can provide the mobile broadband service, that the service network 1 is a service network that can provide a best-matched service for the UE. Certainly, if there is a service network 4 that can simultaneously support the voice service, the mobile broadband service, and the super-high-reliability service, when a highest-priority service, other than the voice service and the mobile broadband service, that is required by the UE is the super-high-reliability service, it may be determined that the service network 4 is a service network that provides a best-matched service for the UE.

Optionally, the priority of the service may change in different application scenarios. In this case, a service network may be selected according to a priority of a service in a specific application scenario. For example, for the UE of the vehicle type, the current UE simultaneously supports the vehicle-to-vehicle communication service and the mobile broadband service, but a current network includes only a service network that supports only the vehicle-to-vehicle communication service and a service network that supports only the mobile broadband service. In this case, because the vehicle-to-vehicle communication service has a higher priority, the UE may preferably select, during driving, the service network that supports the vehicle-to-vehicle communication service, to ensure self-driving, and when the vehicle is at rest in a service area, the UE may preferably select the service network that supports the mobile broadband service, to watch a video to watch a video.

In the prior art, each DÉCOR serves only a user of a particular type. When UE is migrated to a new DÉCOR, the UE may fail to obtain a service that meets a requirement. However, according to the method for selecting a service network in this embodiment of the present disclosure, the priority of the service required by the UE is defined, so that when selecting the service network for the UE, the network device such as the RAN node or the UE can select a service network that can provide a high-priority service for the UE. The method for selecting a service network in this embodiment of the present disclosure may also support a case in which a service network with a best-matched capability is always selected for the UE in the roaming scenario.

Figure 3:
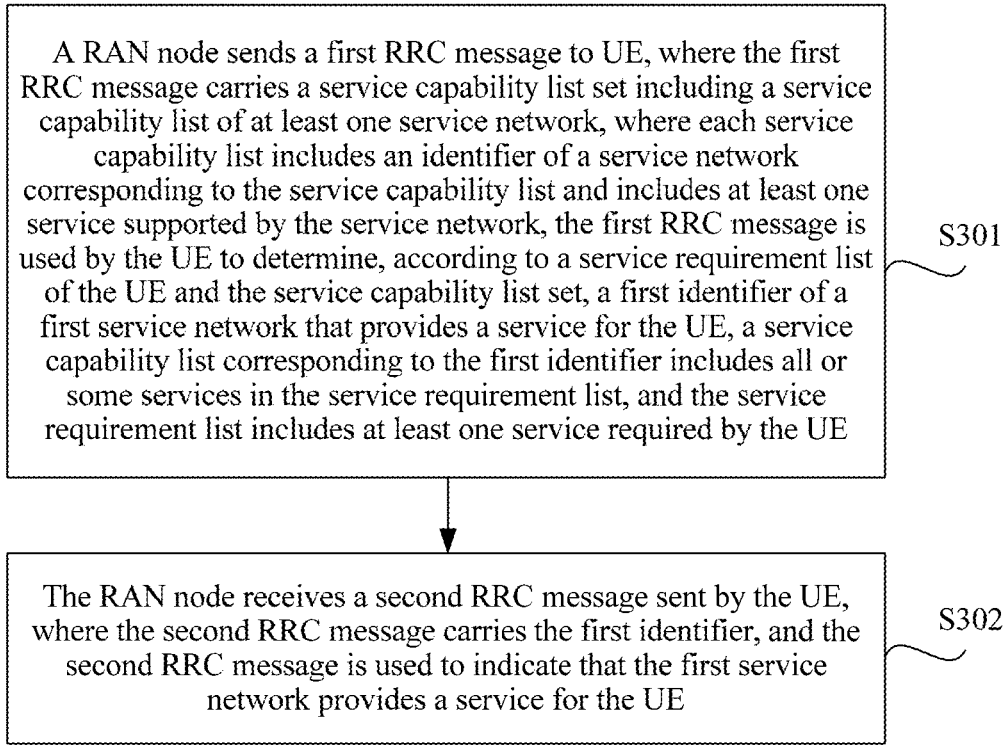
FIG. 3 is a schematic flowchart of a method for selecting a service network according to an embodiment of the present disclosure.

FIG. 3 is a schematic flowchart of a method for selecting a service network according to an embodiment of the present disclosure. The method in FIG. 3 includes the following steps.

S301. A RAN node sends a first RRC message to UE, where the first RRC message carries a service capability list set including a service capability list of at least one service network, where the service capability list includes an identifier of a service network corresponding to the service capability list and includes at least one service supported by the service network, the first RRC message is used by the UE to determine, according to a service requirement list of the UE and the service capability list set, a first identifier of a first service network that provides a service for the UE, a service capability list corresponding to the first identifier includes all or part of the at least one service in the service requirement list, and the service requirement list includes at least one service required by the UE.

S302. The RAN node receives a second RRC message sent by the UE, where the second RRC message carries the first identifier, and the second RRC message is used to indicate that the first service network provides a service for the UE.

According to the method for selecting a service network in the present disclosure, when a service network dynamically changes, a service network that meets a service requirement may be selected for the UE according to the service requirement of a terminal device and a service capability of the service network, so that a process of selecting a service network when a service network dynamically changes can be simplified, and signaling can be saved.

Optionally, the second RRC message sent by the UE may further carry the service requirement list of the UE. Correspondingly, the method may further include: sending, by the RAN node, the service requirement list to the first service network, so that the first service network sends a notification message to the UE according to the service requirement list and the service capability list of the service network, where the notification message is used to notify the UE of a service that is in the service requirement list and that is included in the service capability list of the first service network.

Figure 4:
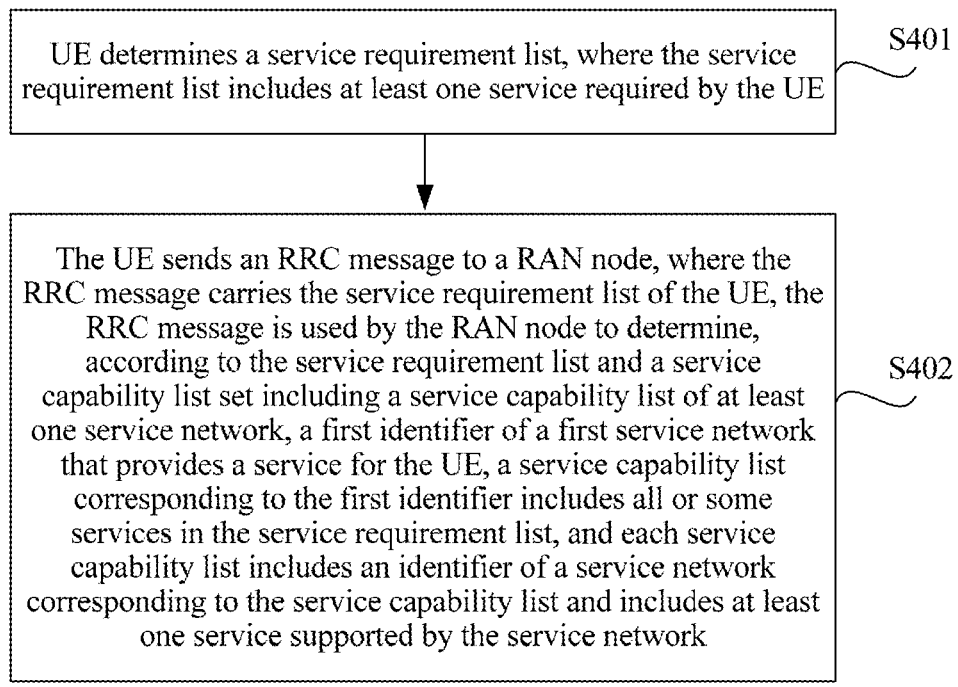
FIG. 4 is a schematic flowchart of a method for selecting a service network according to an embodiment of the present disclosure.

FIG. 4 is a schematic flowchart of a method for selecting a service network according to an embodiment of the present disclosure. The method in FIG. 4 includes the following steps.

S401. UE determines a service requirement list, where the service requirement list includes at least one service required by the UE.

S402. The UE sends an RRC message to a RAN node, where the RRC message carries the service requirement list of the UE, the RRC message is used by the RAN node to determine, according to the service requirement list and from a service capability list set including a service capability list of at least one service network, a first identifier of a first service network that provides a service for the UE, a service capability list corresponding to the first identifier includes all or part of the at least one service in the service requirement list, and the service capability list includes an identifier of a service network corresponding to the service capability list and includes at least one service supported by the service network.

According to the method for selecting a service network in the present disclosure, when a service network dynamically changes, a service network that meets a service requirement may be selected for the UE according to the service requirement of a terminal device and a service capability of the service network, so that a process of selecting a service network when a service network dynamically changes can be simplified, and signaling can be saved.

Optionally, the method may further include: receiving, by the UE, a notification message that is sent by the service network to the UE according to the service requirement list and the service capability list of the service network, where the notification message is used to notify the UE of a service that is in the service requirement list and that is included in the service capability list of the service network.

Figure 5:
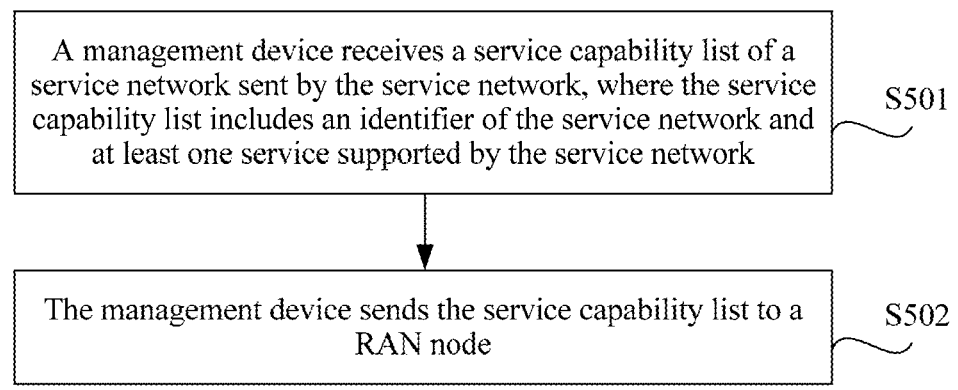
FIG. 5 is a schematic flowchart of a method for managing a service network according to an embodiment of the present disclosure.

FIG. 5 is a schematic flowchart of a method for managing a service network according to an embodiment of the present disclosure. The method in FIG. 5 includes the following steps.

S501. A management device receives a service capability list of a service network sent by the service network, where the service capability list includes an identifier of the service network and at least one service supported by the service network.

S502. The management device sends the service capability list to a RAN node.

According to the method for managing a service network in this embodiment of the present disclosure, when a service network dynamically changes, a status of the service network may be updated to the RAN node in time, so that the RAN node may add, update, or delete a service capability list of a network slice, and finally, a process of selecting a service network when the network dynamically changes can be simplified, and signaling can be saved.

Optionally, the method may further include: generating, by the management device, an instruction message, where the instruction message is used for instructing the RAN node to add, modify, or delete the service capability list of the service network; and sending, by the management device, the instruction message to the RAN node.

According to the method for selecting a service network and the method for managing a service network, a specific procedure of selecting a service network in the embodiments of the present disclosure is described in detail below with reference to FIG. 6 to FIG. 10.

Figure 6:
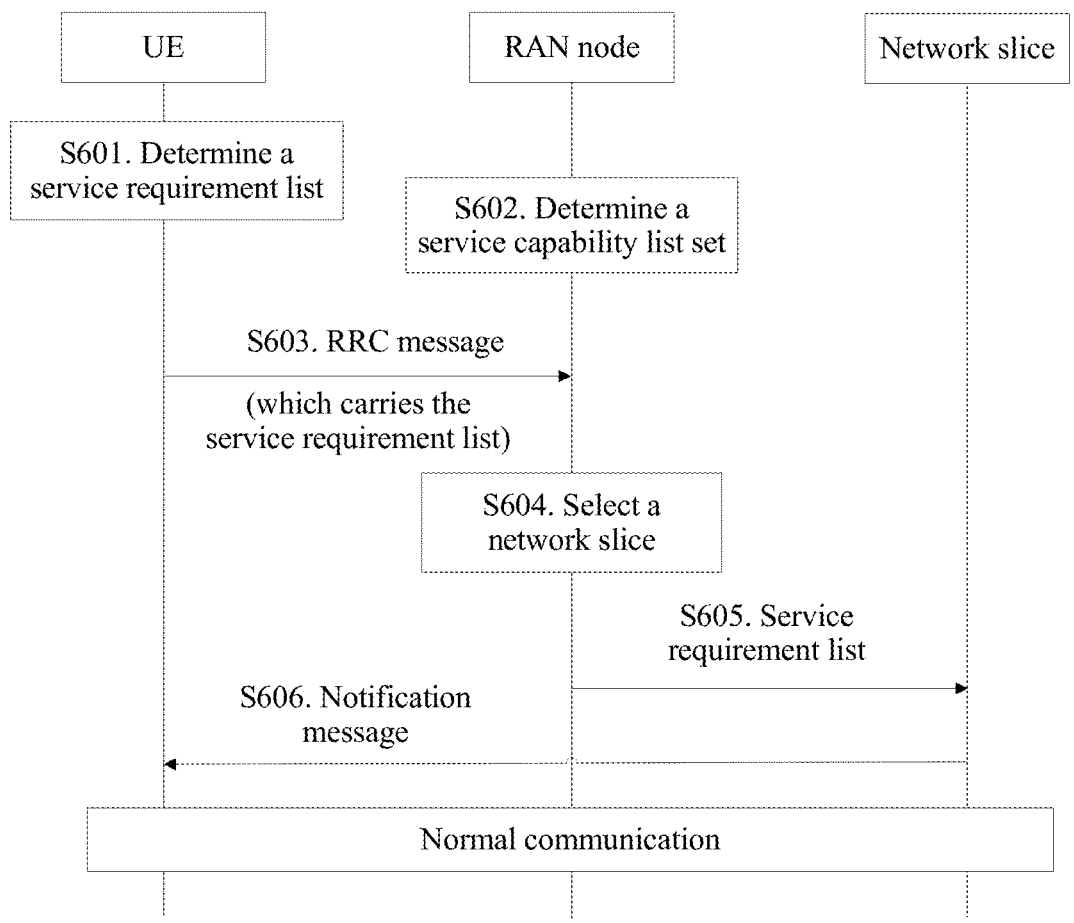
FIG. 6 is a schematic flowchart of a method for selecting a service network according to an embodiment of the present disclosure.

As shown in FIG. 6, FIG. 6 is a schematic flowchart of a method for selecting a service network according to an embodiment of the present disclosure. A network slice in FIG. 6 is a specific example of a specific service network in a 5G network, or the network slice may be replaced with a dedicated core network in an EPC architecture. The method for selecting a service network shown in FIG. 6 includes the following steps.

S601. Configure, on UE, a service requirement list that is allocated to the UE according to a capability of the UE and a service to which the UE subscribes. The service requirement list may be stored on a SIM card or a UE device. The service requirement list may include a voice service, a mobile broadband service, a vehicle-to-vehicle communication service, and a super-high-reliability service.

S602. A RAN node determines a service capability list separately corresponding to at least one network slice. For example, when there are two network slices in a network, a service capability list of one network slice includes the voice service and the mobile broadband service, and a service capability list of the other network slice includes the voice service, the vehicle-to-vehicle communication service, and the super-high-reliability service. The service capability lists of these network slices may be locally configured on the RAN node, or may be sent to the RAN node during deployment of the network slices. A plurality of service capability lists on the RAN node form a service capability list set. The RAN node may further delete, from the service capability list set, a service capability list of a network slice that is out of service due to a failure. The RAN node may be a RAN node in a local network, or may be a RAN node in a visited place in a roaming scenario.

S603. When an RRC connection is established between the UE and the RAN node, the UE sends the service requirement list of the UE to the RAN node when sending an RRC message to the RAN node.

S604. After receiving the service requirement list sent by the UE, the RAN node compares a service in the service requirement list of the UE with services in a plurality of service capability lists on the RAN node, selects a service capability list including all or part of the at least one service in the service requirement list, and obtains an identifier, in the service capability list, of the network slice, where the network slice corresponding to the identifier is a network slice that provides a service for the UE.

For example, when services required by the UE are the voice service, the mobile broadband service, and the super-high-reliability service, one network slice can provide the voice service and the mobile broadband service, and the other network slice can provide the voice service, the vehicle-to-vehicle communication service, and the super-high-reliability service, it may be learned that the other network slice can provide more services for the UE than the one network slice, and therefore the second network slice may be determined as the network slice that provides a service for the UE.

If a priority of a service in a service capability list of the UE is defined, the selected network slice is a network slice that can provide a high-priority service for the UE. For example, in the service capability list of the UE, the voice service is a high-priority service, the mobile broadband service is a medium-priority service, the vehicle-to-vehicle communication service is a low-priority service, and the super-high-reliability service is a lowest-priority service. Because the first network slice can provide the high-priority voice service and the medium-priority mobile broadband service, and the second network slice can provide the high-priority voice service, the low-priority vehicle-to-vehicle communication service, and the lowest-priority super-high-reliability service, it may be learned that the first network slice can provide, for the UE, the high-priority voice service provided by the second network slice, and moreover, a priority of the medium-priority mobile broadband service provided by the first network slice is higher than priorities of other services provided by the second network slice. Therefore, the first network slice may be determined as a service network that provides a best-matched service for the UE.

S605. The RAN node sends the service requirement list of the UE to a selected network slice.

S606. The network slice sends a notification message such as a NAS acceptance message to the UE, to notify the UE of a service that can be provided by the network slice for the UE. The service that can be provided by the network slice for the UE is a service that is in the service requirement list and that is included in the service capability list of the network slice.

In addition, a normal service procedure may be performed between the UE and the selected network slice.

According to the method for selecting a service network in this embodiment of the present disclosure, the RAN node selects the service network for the UE, so that an HSS can be prevented from initiating a large quantity of subscription data update procedures, and a large quantity of TAU and redirection processes can be avoided, so as to reduce a signaling storm occurrence risk. It can be further ensured that a service network that matches a service requirement of the UE or an optimal service network can be matched regardless of whether the UE is in the local network or accesses a network of the visited place in the roaming scenario.

Figure 7:
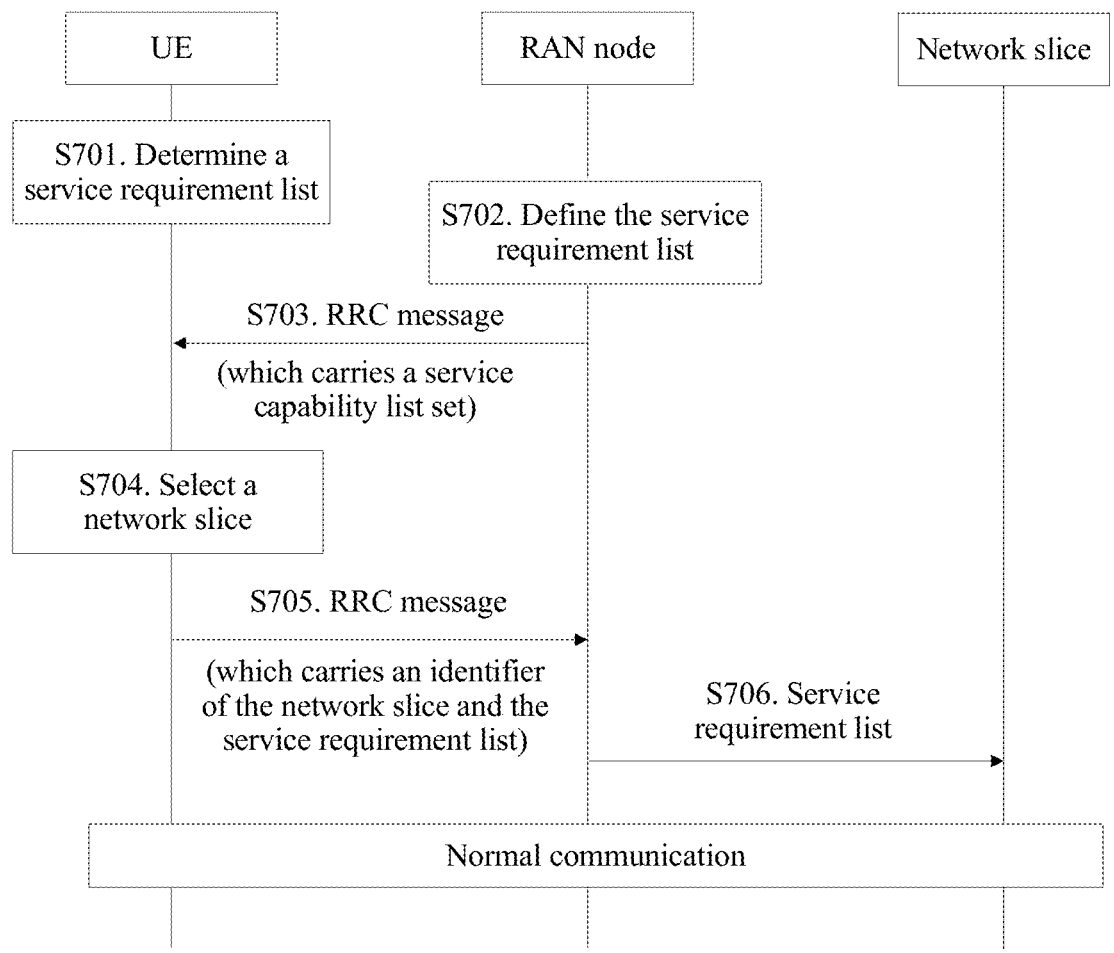
FIG. 7 is a schematic flowchart of a method for selecting a service network according to an embodiment of the present disclosure.

As shown in FIG. 7, FIG. 7 is a schematic flowchart of a method for selecting a service network according to an embodiment of the present disclosure. A network slice in FIG. 7 is a specific example of a specific service network in a 5G network, or the network slice may be replaced with a dedicated core network in an EPC architecture. The method for selecting a service network shown in FIG. 7 includes the following steps.

S701. Configure, on UE, a service requirement list that is allocated to the UE according to a capability of the UE and a service to which the UE subscribes. The service requirement list may be stored on a SIM card or a UE device. The service requirement list may include a voice service, a mobile broadband service, a vehicle-to-vehicle communication service, and a super-high-reliability service.

S702. A RAN node determines a service capability list separately corresponding to at least one network slice. For example, when there are two network slices in a network, a service capability list of one network slice includes the voice service and the mobile broadband service, and a service capability list of the other network slice includes the voice service, the vehicle-to-vehicle communication service, and the super-high-reliability service. The service capability lists of these network slices may be locally configured on the RAN node, or may be sent to the RAN node during deployment of the network slices. A plurality of service capability lists on the RAN node form a service capability list set. The RAN node may be a RAN node in a local network, or may be a RAN node in a visited place in a roaming scenario. The RAN node may further delete, from the service capability list set, a service capability list of a network slice that is out of service due to a failure.

S703. When an RRC connection is established between the UE and the RAN node, the RAN node transfers, in an RRC message, a service capability list set including service capability lists of a plurality of network slices to the UE.

S704. After receiving the service capability list set sent by the RAN node, the UE compares a service in the service requirement list of the UE with services in a plurality of service capability lists obtained from the RAN node, selects a service capability list including all or part of the at least one service in the service requirement list, and obtains an identifier, in the service capability list, of a network slice, where the network slice corresponding to the identifier is a network slice that provides a service and that is selected by the UE for the UE.

For example, when services required by the UE are the voice service, the mobile broadband service, and the super-high-reliability service, one network slice can provide the voice service and the mobile broadband service, and the other network slice can provide the voice service, the vehicle-to-vehicle communication service, and the super-high-reliability service, it may be learned that the second network slice can provide more services for the UE than the first network slice, and therefore the second network slice may be determined as the network slice that provides a service for the UE.

If a priority of a service in a service capability list of the UE is defined, the selected network slice is a network slice that can provide a high-priority service for the UE. For example, in the service capability list of the UE, the voice service is a high-priority service, the mobile broadband service is a medium-priority service, the vehicle-to-vehicle communication service is a low-priority service, and the super-high-reliability service is a lowest-priority service. Because the first network slice can provide the high-priority voice service and the medium-priority mobile broadband service, and the second network slice can provide the high-priority voice service, the low-priority vehicle-to-vehicle communication service, and the lowest-priority super-high-reliability service, it may be learned that the first network slice can provide, for the UE, the high-priority voice service provided by the second network slice, and moreover, a priority of the medium-priority mobile broadband service provided by the first network slice is higher than priorities of other services provided by the second network slice. Therefore, the first network slice may be determined as a service network that provides a best-matched service for the UE.

S705. The UE sends the RRC message such as an attach message or a TAU request message to the RAN node. The RRC message sent by the UE to the RAN node carries a NAS message defined in a standard, and further includes the identifier of the network slice selected by the UE and the service requirement list. In this way, a normal service procedure may be performed between the UE and the selected network slice.

S706. The RAN node sends the service requirement list of the UE to the selected network slice, so that the network slice learns a service required by the UE, and then properly allocates a resource, and provides a service for the UE.

In this case, because the UE has compared the service requirement list of the UE with the service capability list of the selected network slice, the UE has already clearly known a service that is of the UE and that can be supported by the currently selected network slice, and the network slice does not need to notify the UE of the service that can be provided by the network slice for the UE.

According to the method for selecting a service network in this embodiment of the present disclosure, the UE selects the service network for the UE, so that an HSS can be prevented from initiating a large quantity of subscription data update procedures, and a large quantity of TAU and redirection processes can be avoided, so as to reduce a signaling storm occurrence risk. It can be further ensured that a service network that matches a service requirement of the UE or an optimal service network can be matched regardless of whether the UE is in the local network or accesses a network of the visited place in the roaming scenario.

Figure 8:
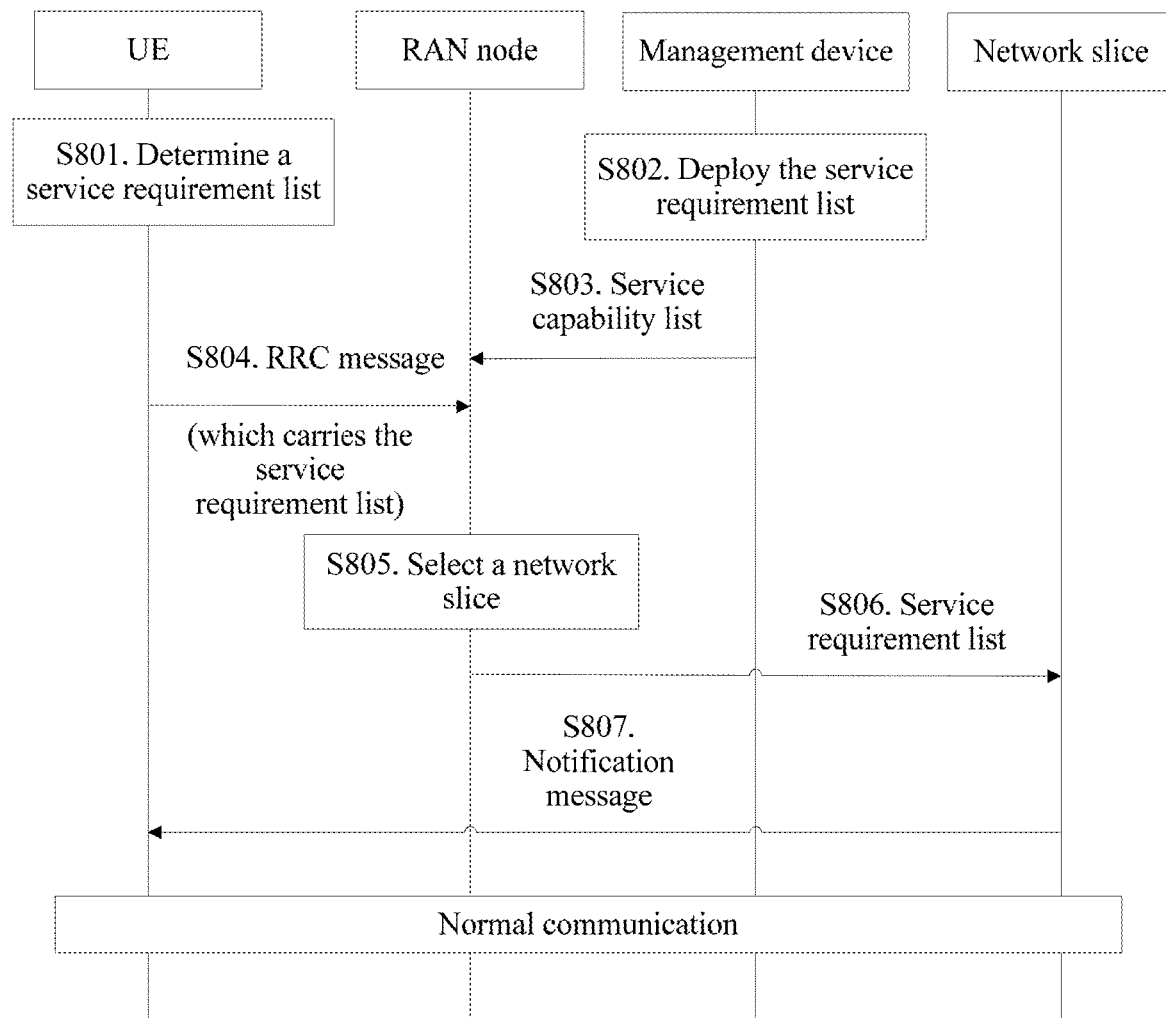
FIG. 8 is a schematic flowchart of a method for selecting a service network according to an embodiment of the present disclosure.

As shown in FIG. 8, FIG. 8 is a schematic flowchart of a method for selecting a service network according to an embodiment of the present disclosure. A network slice in FIG. 8 is a specific example of a specific service network in a 5G network, or the network slice may be replaced with a dedicated core network in an EPC architecture. The method for selecting a service network shown in FIG. 8 includes the following steps.

S801. Configure, on UE, a service requirement list that is allocated to the UE according to a capability of the UE and a service to which the UE subscribes. The service requirement list may be stored on a SIM card or a UE device. The service requirement list may include a voice service, a mobile broadband service, a vehicle-to-vehicle communication service, and a super-high-reliability service.

S802. A management device determines a service capability list of a newly-added network slice or an updated service capability list of an existing service slice. For example, the management device may obtain a service capability list of a network slice including the voice service and the mobile broadband service, and a service capability list of a network slice including the voice service, the vehicle-to-vehicle communication service, and the super-high-reliability service.

S803. The management device sends the service capability list of the network slice to a RAN node. The RAN node receives the service capability list of the network slice sent by the management device, to update a service capability list set. The service capability list forms the service capability list set on the RAN node. The RAN node may be a RAN node in a local network, or may be a RAN node in a visited place in a roaming scenario.

S804. When an RRC connection is established between the UE and the RAN node, the UE sends the service requirement list of the UE to the RAN node when sending an RRC message to the RAN node.

S805. After receiving the service requirement list sent by the UE, the RAN node compares a service in the service requirement list of the UE with a service in the updated service capability list set on the RAN node, selects a service capability list including all or part of the at least one service in the service capability list, and obtains an identifier of the network slice, where the network slice corresponding to the identifier is a network slice that provides a service for the UE.

For example, when services required by the UE are the voice service, the mobile broadband service, and the super-high-reliability service, one network slice can provide the voice service and the mobile broadband service, and the other network slice can provide the voice service, the vehicle-to-vehicle communication service, and the super-high-reliability service, it may be learned that the second network slice can provide more services for the UE than the first network slice, and therefore the second network slice may be determined as the network slice that provides a service for the UE.

If a priority of a service in a service capability list of the UE is defined, the selected network slice is a network slice that can provide a high-priority service for the UE. For example, in the service capability list of the UE, the voice service is a high-priority service, the mobile broadband service is a medium-priority service, the vehicle-to-vehicle communication service is a low-priority service, and the super-high-reliability service is a lowest-priority service. Because the first network slice can provide the high-priority voice service and the medium-priority mobile broadband service, and the second network slice can provide the high-priority voice service, the low-priority vehicle-to-vehicle communication service, and the lowest-priority super-high-reliability service, it may be learned that the first network slice can provide, for the UE, the high-priority voice service provided by the second network slice, and moreover, a priority of the medium-priority mobile broadband service provided by the first network slice is higher than priorities of other services provided by the second network slice. Therefore, the first network slice may be determined as a service network that provides a best-matched service for the UE.

S806. The RAN node sends the service requirement list of the UE to the network slice.

S807. The network slice sends a notification message such as a NAS acceptance message to the UE, to notify the UE of a service that can be provided by the network slice for the UE. The service that can be provided by the network slice for the UE is a service that is in the service requirement list and that is included in the service capability list of the network slice.

In addition, a normal service procedure may be performed between the UE and the selected network slice.

Optionally, in S802, the management device may determine an out-of-service network slice. Correspondingly, in S803, the management device sends an instruction message to the RAN node, to instruct the RAN node to delete a service capability list of the out-of-service network slice. The RAN node receives the instruction message sent by the management device, deletes, according to the instruction message, the service capability list of the out-of-service network slice, and updates the service capability list set. The RAN node may be a RAN node in a local network, or may be a RAN node in a visited place in a roaming scenario. In this case, in S805, after receiving the service requirement list sent by the UE, the RAN node compares the service in the service requirement list of the UE with a service in a service capability list in the service capability list set that is on the RAN node and from which the service capability list of the out-of-service network slice is deleted.

Figure 9:
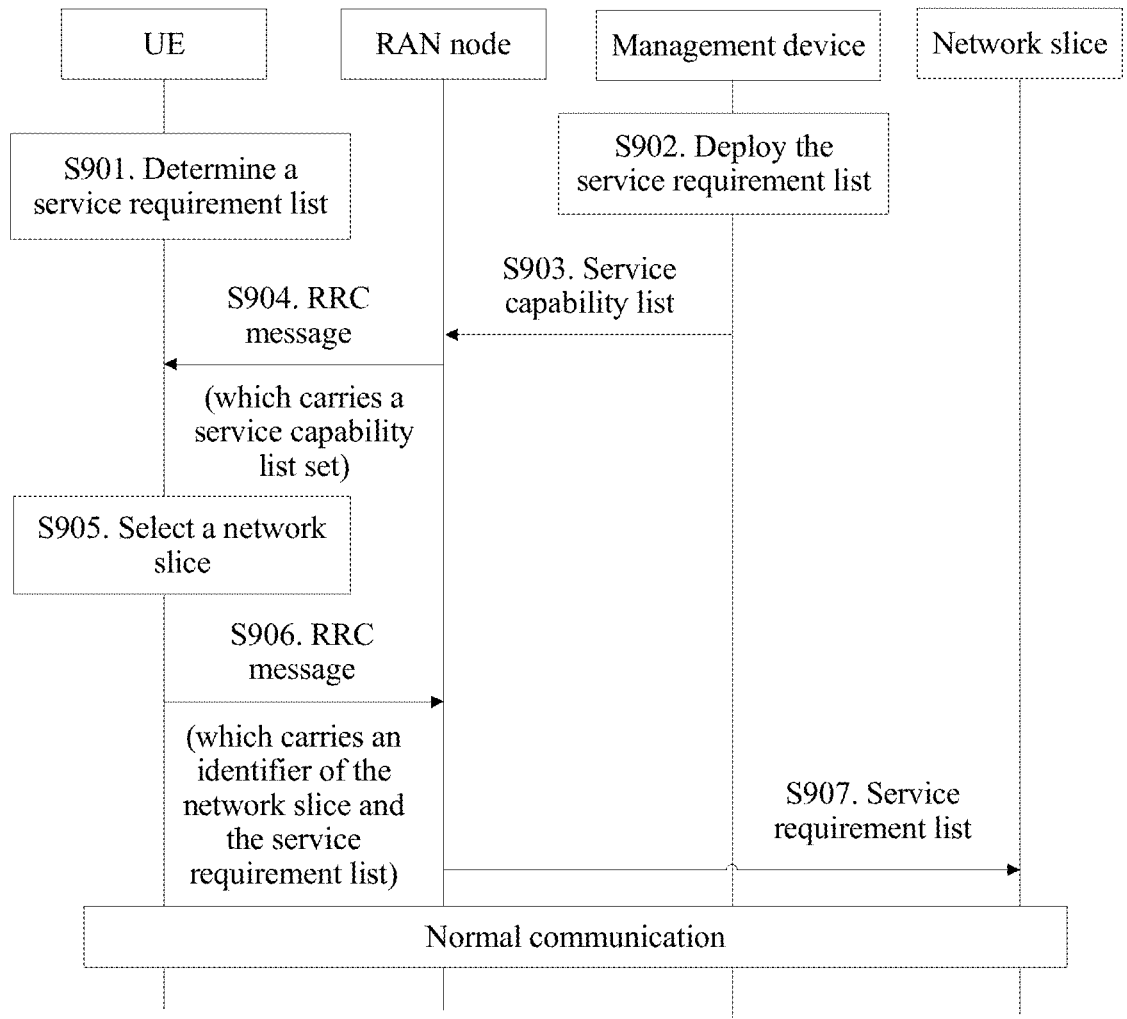
FIG. 9 is a schematic flowchart of a method for selecting a service network according to an embodiment of the present disclosure.

As shown in FIG. 9, FIG. 9 is a schematic flowchart of a method for selecting a service network according to an embodiment of the present disclosure. A network slice in FIG. 9 is a specific example of a specific service network in a 5G network, or the network slice may be replaced with a dedicated core network in an EPC architecture. The method for selecting a service network shown in FIG. 9 includes the following steps.

S901. Configure, on UE, a service requirement list that is allocated to the UE according to a capability of the UE and a service to which the UE subscribes. The service requirement list may be stored on a SIM card or a UE device. The service requirement list may include a voice service, a mobile broadband service, a vehicle-to-vehicle communication service, and a super-high-reliability service.

S902. A management device determines a service capability list of a newly-added network slice or an updated service capability list of an existing service slice. For example, the management device may obtain a service capability list of a network slice including the voice service and the mobile broadband service, and a service capability list of a network slice including the voice service, the vehicle-to-vehicle communication service, and the super-high-reliability service.

S903. The management device sends the service capability list of the network slice to a RAN node. The RAN node receives the service capability list of the network slice sent by the management device, to update a service capability list set. As shown in Table 3, the service capability list forms the service capability list set on the RAN node. The RAN node may be a RAN node in a local network, or may be a RAN node in a visited place in a roaming scenario.

S904. When an RRC connection is established between the UE and the RAN node, the RAN node transfers, in an RRC message, an updated service capability list set including service capability lists of a plurality of network slices to the UE.

S905. After receiving the service capability list set sent by the RAN, the UE compares a service in the service requirement list of the UE with services in a plurality of service capability lists obtained from the RAN node, selects a service capability list including all or part of the at least one service in the service requirement list, and obtains an identifier, in the service capability list, of a network slice, where the network slice corresponding to the identifier is a network slice that provides a service and that is selected by the UE for the UE.

For example, when services required by the UE are the voice service, the mobile broadband service, and the super-high-reliability service, one network slice can provide the voice service and the mobile broadband service, and the other network slice can provide the voice service, the vehicle-to-vehicle communication service, and the super-high-reliability service, it may be learned that the second network slice can provide more services for the UE than the first network slice, and therefore the second network slice may be determined as the network slice that provides a service for the UE.

If a priority of a service in a service capability list of the UE is defined, the selected network slice is a network slice that can provide a high-priority service for the UE. For example, in the service capability list of the UE, the voice service is a high-priority service, the mobile broadband service is a medium-priority service, the vehicle-to-vehicle communication service is a low-priority service, and the super-high-reliability service is a lowest-priority service. Because the first network slice can provide the high-priority voice service and the medium-priority mobile broadband service, and the second network slice can provide the high-priority voice service, the low-priority vehicle-to-vehicle communication service, and the lowest-priority super-high-reliability service, it may be learned that the first network slice can provide, for the UE, the high-priority voice service provided by the second network slice, and moreover, a priority of the medium-priority mobile broadband service provided by the first network slice is higher than priorities of other services provided by the second network slice. Therefore, the first network slice may be determined as a service network that provides a best-matched service for the UE.

S906. The UE sends the RRC message such as an attach message or a TAU request message to the RAN node. The RRC message sent by the UE to the RAN node carries a NAS message defined in a standard, and further includes the identifier of the network slice selected by the UE and the service requirement list. In this case, a normal service procedure may be performed between the UE and the selected network slice.

S907. The RAN node sends the service requirement list of the UE to the network slice, so that the network slice learns a service required by the UE, and then properly allocates a resource, and provides a service for the UE.

In this case, because the UE has compared the service requirement list of the UE with the service capability list of the selected network slice, the UE has already clearly known a service that is of the UE and that can be supported by the currently selected network slice, and the network slice does not need to notify the UE of the service that can be provided by the network slice for the UE.

Optionally, in S902, the management device may determine an out-of-service network slice. Correspondingly, in S903, the management device sends an instruction message to the RAN node, to instruct the RAN node to delete a service capability list of the out-of-service network slice. The RAN node receives the instruction message sent by the management device, deletes, according to the instruction message, the service capability list of the out-of-service network slice, and updates the service capability list set. The RAN node may be a RAN node in a local network, or may be a RAN node in a visited place in a roaming scenario. In this case, in S905, after receiving the service requirement list sent by the UE, the RAN node compares the service in the service requirement list of the UE with a service in a service capability list in the service capability list set that is on the RAN node and from which the service capability list of the out-of-service network slice is deleted.

The method for and the process of selecting a service network are described in detail above according to FIG. 2 to FIG. 9. A RAN node, UE, and a management device that are involved in service network selection are described in detail below with reference to FIG. 10 to FIG. 13.

Figure 10:
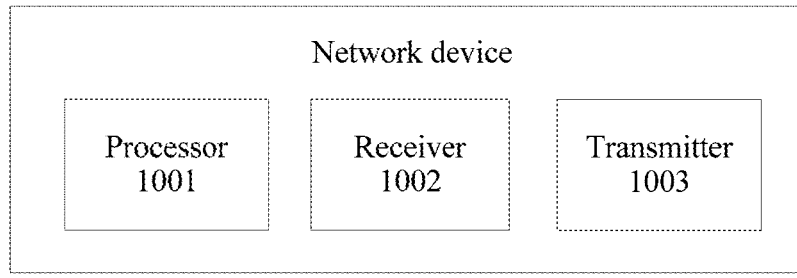
FIG. 10 is a schematic block diagram of a network device for selecting a service network according to an embodiment of the present disclosure.

FIG. 10 is a schematic block diagram of a RAN node according to an embodiment of the present disclosure. The network device for selecting a service network shown in FIG. 10 includes a processor 1001, a receiver 1002, and a transmitter 1003.

The receiver 1002 is configured to receive a message, and the transmitter 1003 is configured to send the message. The processor 1001 is configured to determine a service requirement list of user equipment UE, and the service requirement list includes at least one service required by the UE. The processor 1001 is further configured to determine a service capability list set including a service capability list of at least one service network, and the service capability list includes an identifier of a service network corresponding to the service capability list and includes at least one service supported by the service network. The processor 1001 is further configured to determine, according to the service requirement list and the service capability list set, a first identifier of a first service network that provides a service for the UE, and a service capability list corresponding to the first service network includes all or part of the at least one service in the service requirement list.

According to the network device in this embodiment of the present disclosure, when a service network dynamically changes, a service network that meets a service requirement may be selected for the UE according to the service requirement of a terminal device and a service capability of the service network, so that a process of selecting a service network when the network dynamically changes can be simplified, and signaling can be saved.

In this embodiment of the present disclosure, optionally, the processor 1001 is specifically configured to: determine, according to the service requirement list and the service capability list set, an identifier corresponding to a service capability list that includes a largest quantity of services in the service requirement list and that is in the service capability list set as the first identifier of the first service network that provides a service for the UE.

In this embodiment of the present disclosure, the network device shown in FIG. 10 may be the UE or a RAN node. When the network device is the UE, the receiver 1002 is specifically configured to receive an RRC message sent by the RAN node, and the RRC message carries the service capability list set. The processor 1001 is specifically configured to determine the service capability list set according to the RRC message received by the receiver 1002. The transmitter 1003 is further specifically configured to send another RRC message to the RAN node, and the RRC message carries an identifier of a service network that provides a service for the UE.

Optionally, the RRC message sent by the UE to the RAN node further carries the service requirement list of the UE, so that the RAN node sends, to the first service network that provides a service for the UE, a message that carries the service requirement list.

When the network device shown in FIG. 10 is the RAN node, the receiver 1002 is configured to receive an RRC message sent by the UE, and the RRC message carries the service requirement list of the UE. The processor 1001 is specifically configured to determine the service requirement list according to the RRC message received by the receiver 1002. The receiver 1002 is further configured to: receive the service capability list of the service network sent by a management device, or receive the service capability list of the at least one service network sent by the at least one service network. The processor 1001 is further specifically configured to determine the service capability list set including the service capability list of the at least one service network.

Optionally, the transmitter 1003 is specifically configured to send, to the first service network, a message that carries the service requirement list, so that the first service network sends a notification message to the UE according to the service requirement list and the service capability list of the first service network. The notification message is used to notify the UE of a service that is in the service requirement list and that is included in the service capability list of the first service network.

Optionally, the receiver 1002 is further configured to receive an instruction message sent by the management device, and the instruction message is used for instructing the RAN node to add, modify, or delete the service capability list of the at least one service network. The processor 1001 is further configured to add, modify, or delete the service capability list of the at least one service network in the service capability set according to the instruction message.

Optionally, the service requirement list of the UE may further include a priority of the at least one service required by the UE. In this case, the processor 1001 is specifically configured to search the service capability list set according to services in the service requirement list in descending order of priorities corresponding to the services, to determine the first identifier of the first service network that provides a service for the UE.

It should be understood that, in this embodiment of the present disclosure, the processor 1001 may be a central processing unit (CPU), or the processor 1001 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor, or the like.

Figure 11:
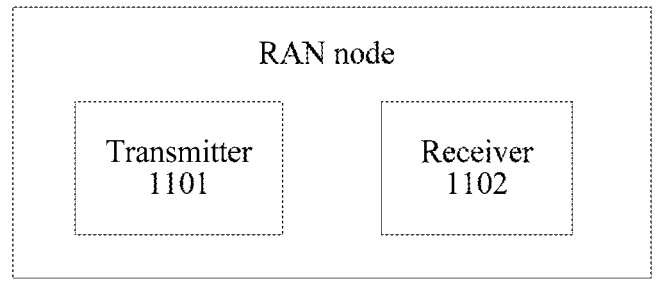
FIG. 11 is a schematic block diagram of a RAN node according to an embodiment of the present disclosure.

FIG. 11 is a schematic block diagram of a RAN node according to an embodiment of the present disclosure. The RAN node shown in FIG. 11 includes a transmitter 1101 and a receiver 1102.

The receiver 1102 is configured to: receive a service capability list of at least one service network sent by a management device, or receive a service capability list of at least one service network sent by the at least one service network. The service capability list includes an identifier of a service network corresponding to the service capability list and includes at least one service supported by the service network. The transmitter 1101 is configured to send a first RRC message to UE. The first RRC message carries a service capability list set including the service capability list of the at least one service network, the service capability list includes an identifier of a service network corresponding to the service capability list and includes at least one service supported by the service network, the first RRC message is used by the UE to determine a first identifier from the service capability list set according to a service requirement list of the UE, and a service capability list corresponding to the first identifier includes all or part of the at least one service in the service requirement list, so that a first service network corresponding to the first identifier provides a service for the UE, and the service requirement list includes at least one service required by the UE. The receiver 1102 is further configured to receive a second RRC message sent by the UE. The second RRC message carries the first identifier, and the second RRC message is used to indicate that the first service network provides a service for the UE.

According to the RAN node in this embodiment of the present disclosure, when a service network dynamically changes, a service network that meets a service requirement may be selected for the UE according to the service requirement of a terminal device and a service capability of the service network, so that a process of selecting a service network when the network dynamically changes can be simplified, and signaling can be saved.

Optionally, the second RRC message sent by the UE may further carry the service requirement list of the UE. The transmitter 1101 is further configured to send the service requirement list to the first service network, so that the first service network sends a notification message to the UE according to the service requirement list and the service capability list of the service network. The notification message is used to notify the UE of a service that is in the service requirement list and that is included in the service capability list of the first service network.

Optionally, the receiver 1102 is further configured to receive the service capability list of the service network sent by the management device.

Optionally, the receiver 1102 may be further configured to receive an instruction message sent by the management device, and the instruction message is used for instructing the RAN node to add, modify, or delete the service capability list of the at least one service network. Correspondingly, the RAN node may further include a processor, configured to add, modify, or delete the service capability list of the at least one service network in the service capability set according to the instruction message.

Figure 12:
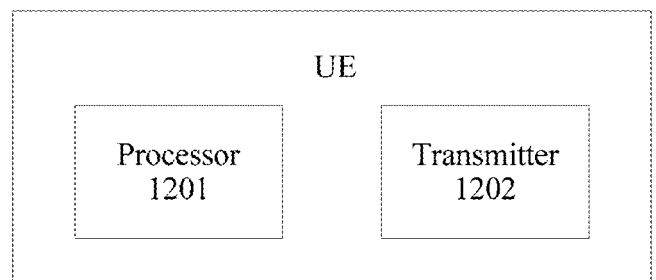
FIG. 12 is a schematic block diagram of UE according to an embodiment of the present disclosure.

FIG. 12 is a schematic block diagram of UE according to an embodiment of the present disclosure. The UE shown in FIG. 12 includes a processor 1201 and a transmitter 1202.

The processor 1201 is configured to determine a service requirement list of the UE, and the service requirement list includes at least one service required by the UE. The transmitter 1202 is configured to send an RRC message to a RAN node. The RRC message carries the service requirement list, the RRC message is used by the RAN node to determine, according to the service requirement list, a first identifier from a service capability list set including a service capability list of at least one service network, and a service capability list corresponding to the first identifier includes all or part of the at least one service in the service requirement list, so that a first service network corresponding to the first identifier provides a service for the UE, and the service capability list includes an identifier of a service network corresponding to the service capability list and includes at least one service supported by the service network.

According to the UE in this embodiment of the present disclosure, when a service network dynamically changes, a service network that meets a service requirement may be selected for the UE according to the service requirement of a terminal device and a service capability of the service network, so that a process of selecting a service network when the network dynamically changes can be simplified, and signaling can be saved.

Optionally, the UE may further include a receiver, configured to receive a notification message that is sent by the first service network to the UE according to the service requirement list and the service capability list of the first service network. The notification message is used to notify the UE of a service that is in the service requirement list and that is included in the service capability list of the first service network.

Optionally, the service requirement list of the UE may further include a priority of the at least one service required by the UE. The processor 1201 is specifically configured to search the service capability list set according to services in the service requirement list in descending order of priorities corresponding to the services, to determine the first identifier of the first service network that provides a service for the UE.

It should be understood that, in this embodiment of the present disclosure, the processor 1201 may be a central processing unit (CPU), or the processor 1201 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor, or the like.

Figure 13:
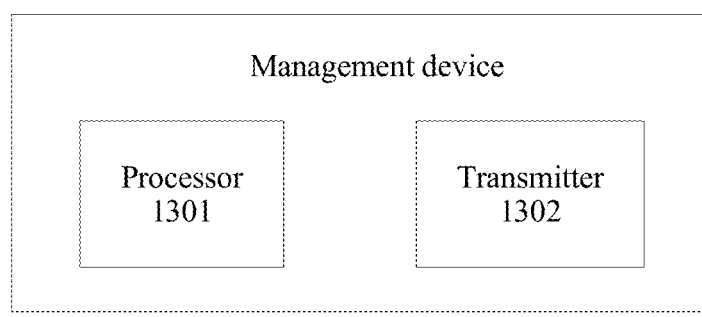
FIG. 13 is a schematic block diagram of a management device according to an embodiment of the present disclosure.

FIG. 13 is a schematic block diagram of a management device according to an embodiment of the present disclosure. The management device shown in FIG. 13 includes a receiver 1301 and a transmitter 1302. A service capability list of a service network is deployed on the management device.

The receiver 1301 is configured to receive a service capability list of a service network sent by the service network, and the service capability list includes an identifier of the service network and at least one service supported by the service network. The transmitter 1302 is configured to send the service capability list of the service network to a RAN node.

According to the management device in this embodiment of the present disclosure, when a service network dynamically changes, a status of the service network may be updated to the RAN node in time, so that the RAN node may add, update, or delete a service capability list of a network slice, and finally, a process of selecting a service network when the network dynamically changes can be simplified, and signaling can be saved.

Optionally, the management device may further include a processor, configured to generate an instruction message, and the instruction message is used for instructing the RAN node to add, modify, or delete the service capability list of the service network. The transmitter 1302 is further configured to send the instruction message to the RAN node.

It should be understood that, in this embodiment of the present disclosure, the processor may be a central processing unit (CPU), or the processor may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor, or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for selecting a network slice, comprising:
   determining, by a management device in a network for managing at least one network slice, a service requirement list of user equipment (UE), wherein the service requirement list comprises at least one service type for the UE;
   determining, by the management device, a service capability list set comprising a service capability list of the at least one network slice, wherein the service capability list comprises an identifier of a network slice corresponding to the service capability list and comprises at least one service type supported by the network slice; and
   determining, by the management device, according to the service requirement list and the service capability list set, a first identifier of a first network slice that provides a service for the UE, wherein a service capability list corresponding to the first network slice comprises all or part of the at least one service type in the service requirement list.

2. The method according to claim 1, wherein the service requirement list further comprises a priority corresponding to the service required by the UE; and
   determining, according to the service requirement list and the service capability list set, the first identifier of the first network slice that provides a service for the UE comprises:
   searching the service capability list set according to services in the service requirement list in descending order of priorities corresponding to the services, to determine the first identifier.

3. The method according to claim 1 further comprises: sending, by a network slice, a service capability list of the network slice to the management device.

4. The method according to claim 1, wherein the service type comprises: a mobile broadband service, a vehicle to vehicle communication service, a machine type communication service, an ultra-low delay service, a super-high-reliability service, or an Internet Protocol (IP) continuity maintaining service.

5. The method according to claim 1, the service requirement list of user equipment is configured by a subscriber server.

6. The method according to claim 1, wherein the determination of the first identifier is by virtue of the service capability list corresponding to the first identifier comprises a largest quantity of services in the service requirement list among the at least one capability list in the service capability list set.

7. A network device for selecting a service network, comprising a receiver, a processor, and a transmitter, wherein the receiver is configured to receive a message, and the transmitter is configured to send the message;
   the processor is configured to determine a service requirement list of user equipment (UE), wherein the service requirement list comprises at least one service type required by the UE;
   the processor is further configured to determine a service capability list set comprising a service capability list of the at least one network slice, wherein the service capability list comprises an identifier of a network slice corresponding to the service capability list and comprises at least one service type supported by the network slice; and
   the processor is further configured to determine, according to the service requirement list and the service capability list set, a first identifier of a first network slice that provides a service for the UE, wherein a service type capability list corresponding to the first network slice comprises all or part of the at least one service type in the service requirement list.

8. The network device according to claim 7, wherein the network device is a management device for managing at least one network slice.

9. The network device according to claim 7, wherein the service type comprises: a mobile broadband service, a vehicle to vehicle communication service, a machine type communication service, an ultra-low delay service, a super-high-reliability service, or an Internet Protocol (IP) continuity maintaining service.

10. The network device according to claim 7, the service requirement list of user equipment is configured by a subscriber server.

11. The network device according to claim 7, wherein the determination of the first identifier is by virtue of the service capability list corresponding to the first identifier comprises a largest quantity of services in the service requirement list among the at least one capability list in the service capability list set.

* * * * *

UNITED STATES PATENT AND TRADEMARK OFFICE
CERTIFICATE OF CORRECTION

PATENT NO. : 11,012,928 B2
APPLICATION NO. : 15/975800
DATED : May 18, 2021
INVENTOR(S) : Yuan Wang et al.

Page 1 of 1

It is certified that error appears in the above-identified patent and that said Letters Patent is hereby corrected as shown below:

In the Claims

Column 32, Line 37, please delete "type" between "service" and "capability".

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*